March 6, 1956 M. GREENBERG 2,737,078
OPHTHALMOSCOPES
Filed Dec. 3, 1951 4 Sheets-Sheet 1
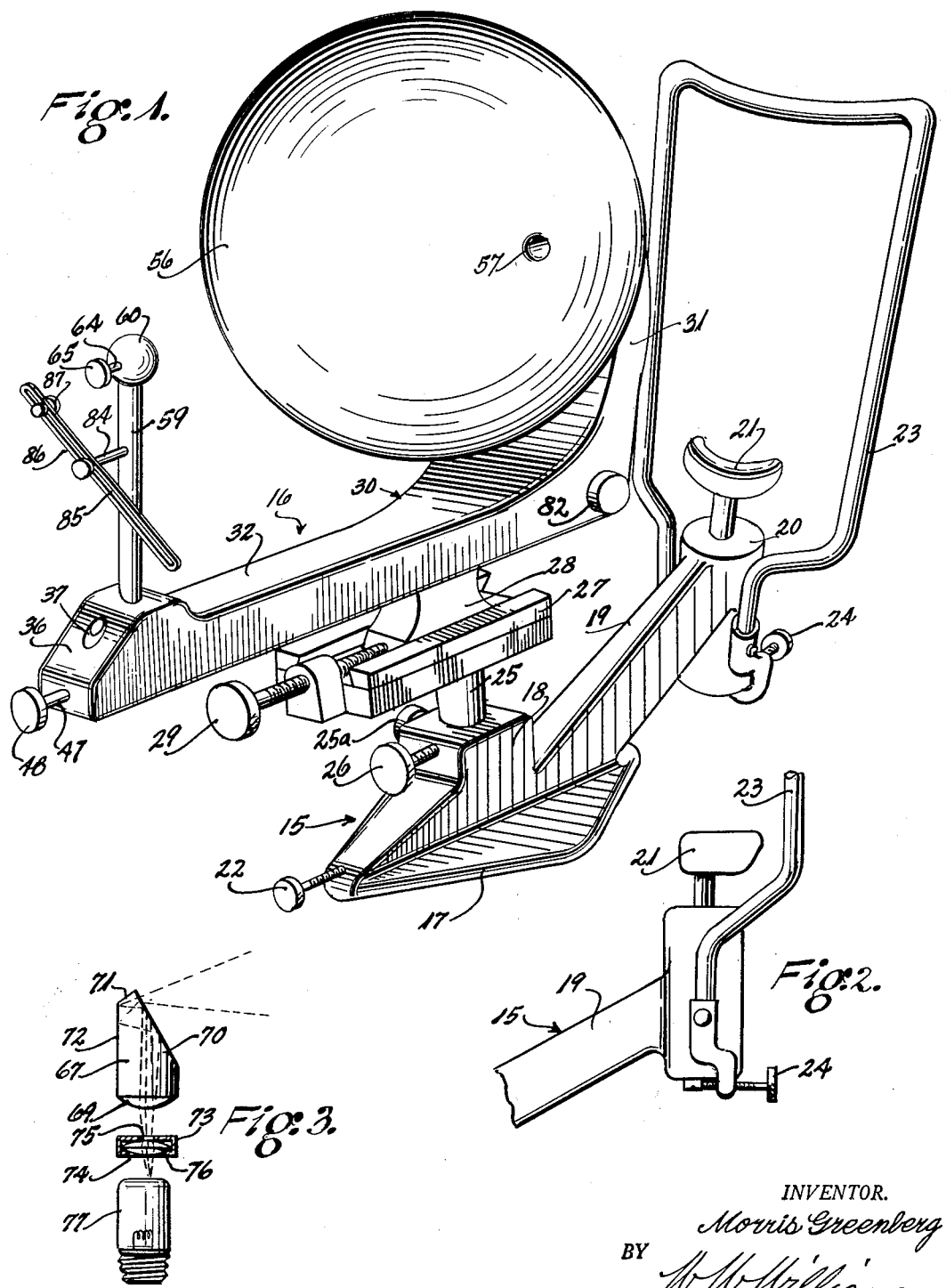
INVENTOR.
Morris Greenberg
BY
W. W. Williamson
ATTORNEY

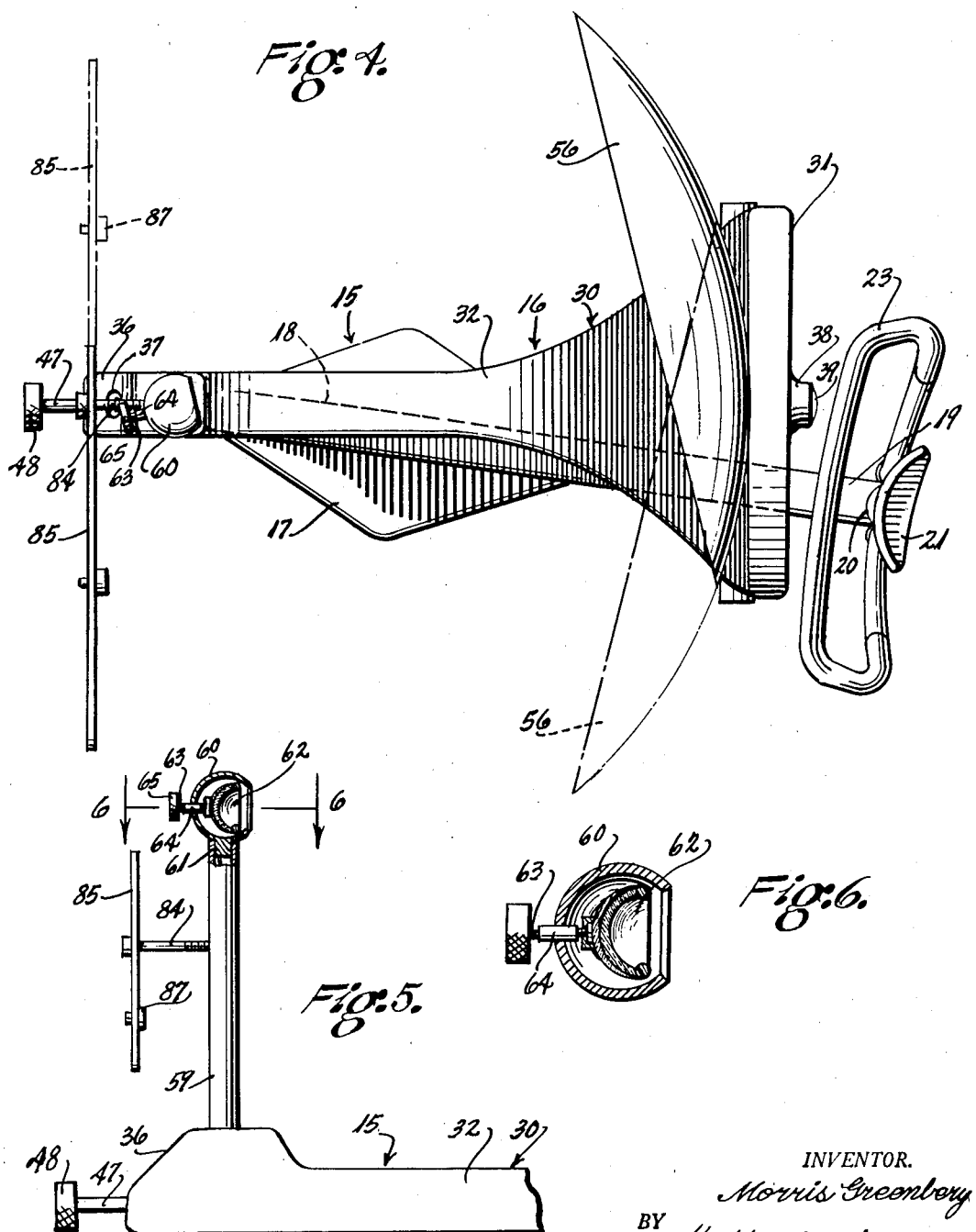

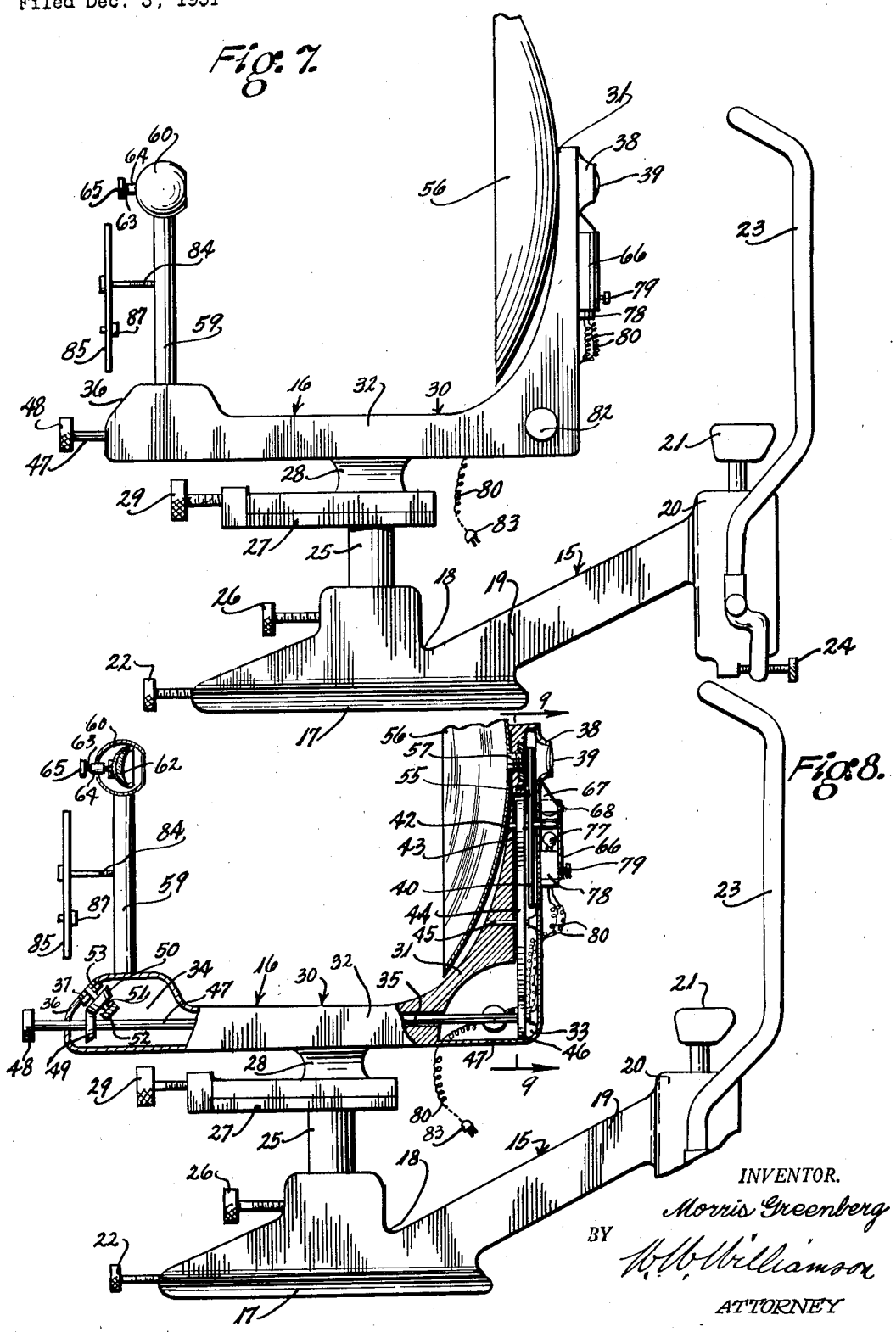

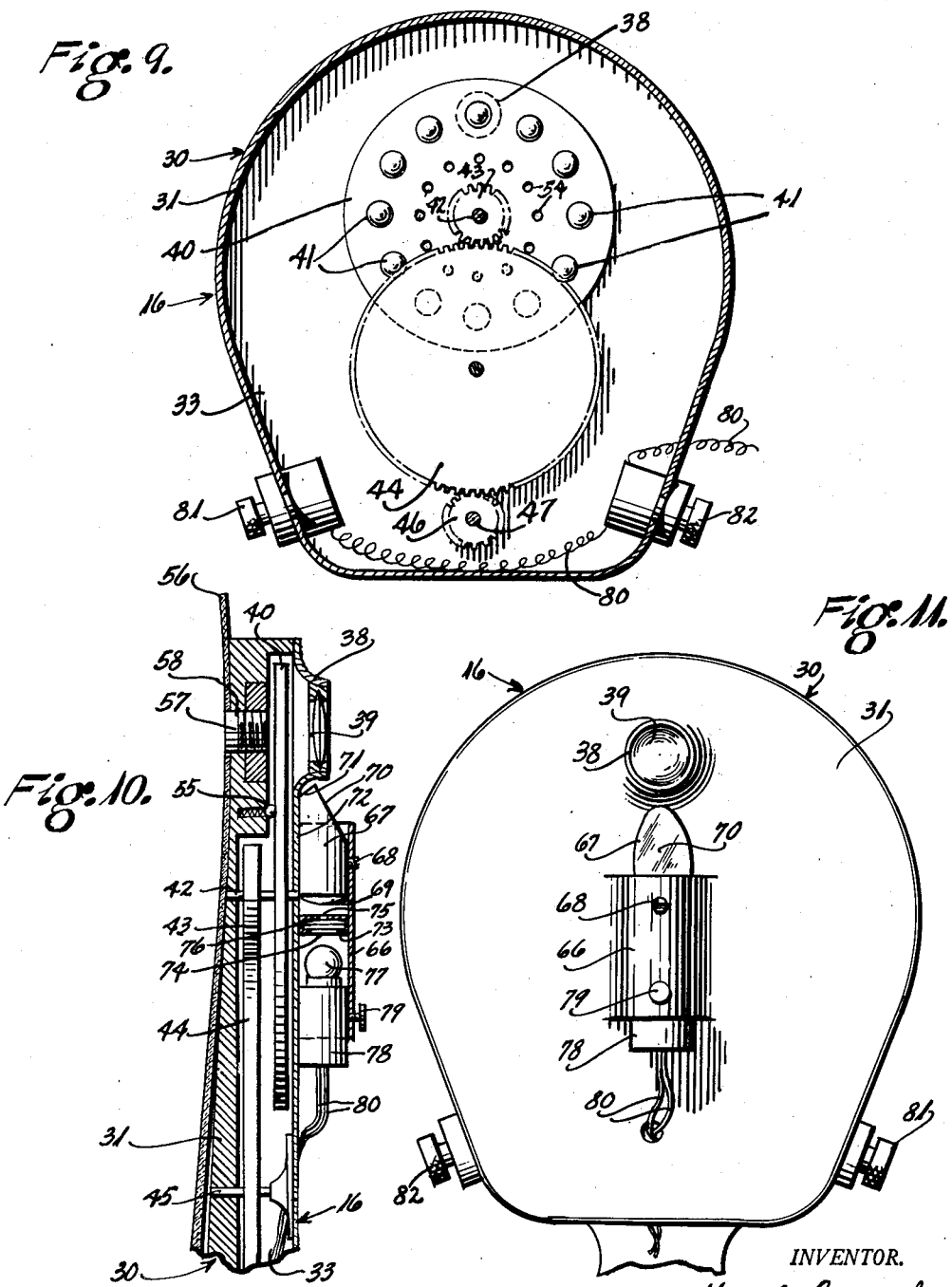

2,737,078

United States Patent Office

Patented Mar. 6, 1956

2,737,078
OPHTHALMOSCOPES
Morris Greenberg, Vineland, N. J.

Application December 3, 1951, Serial No. 259,663

16 Claims. (Cl. 88—20)

My invention relates to a new and useful ophthalmoscope or instrument for examination of the eye to ascertain whether or not the organ is normal and, if not normal, to determine the amount of abnormality, injury, disease and similar or related defects which effect the human eye.

One of the essential objects of this invention is to produce an instrument by which a magnified or enlarged reflected image of the interior of the eye may be obtained to plainly show the anatomy as well as any existent defective features thereof.

Another object of the invention is to produce a unique instrument including a base section having a forwardly and upwardly projecting arm supporting a chin rest and face bracket and a main section carried by said base section, said main section being vertically, rotatably or angularly and slidably adjustable and supporting an adjustable screen rotatable about the axis of an eyepiece, said screen provided with a light opening for directing light rays, emanating from a light source at the front of the device, but in back of the screen, into the eye and illuminating its interior, the image of which is reflected through a lens system and thence to a mirror lens for reflecting said image onto the face of said screen.

Another object of the present invention is to produce an ophthalmoscope including a curved screen having a parabolically concave surface and eccentrically pivotally mounted on a suitable support with a light opening through the pivoting means and a mirror lens opposed to the screen face for reflecting an image of the eye interior through the medium of light rays projected into the eye, thence to the mirror lens and finally to the screen.

Another object of the invention is to provide means in the form of a novel combination of elements constituting a controllable lighting system the rays from which may be directed into the eye in a manner to produce highly efficient results without injury to the ocular tissue.

Another object of the invention is to provide an adjustable fixation target in conjunction with the support for the mirror lens whereby the patient's eye can be directed to any desired position during the course of the examination bringing different fields of view into position for observation.

Another object of this invention is to provide a parabolic concave mirror lens in a housing for reflecting certain rays of light onto the screen, said housing being rotatable horizontally and said mirror lens being adjustable to and fro within the housing.

Another object of the invention is to provide a plurality of optical lenses of various dioptric power mounted in a revolvable disc having means to actuate it and associated with indicating means to show which lens is in operative position.

A further object of this invention is to provide an eyepiece as an extension of the front or outer wall of the upright or perpendicular leg of the main section housing and containing an achromatic objective lens.

A still further object of the present invention is to provide several independent means for adjusting and holding the several parts in different relationships for prolonged observation of the various fields of view associated with a funduscopic examination.

With the above and other objects in view, which will be apparent from the subsequent description, this invention consists of the details of construction and combination of elements hereinafter set forth and then designated by the claims.

In order that those skilled in the art to which this invention appertains may understand how to make and use the same I will describe a construction in detail, referring by numerals to the accompanying drawings forming a part hereof, in which:

Fig. 1 is a perspective view of the ophthalmoscope constructed in accordance with my invention which embodies accepted optical principles and structural features combined to produce a novel instrument.

Fig. 2 is a fragmentary side elevation of the base section of the instrument illustrating the relationship of the chin rest and face bracket and a conventional means for adjusting the same.

Fig. 3 is a schematic view of the elements of illuminating condenser system.

Fig. 4 is a top plan view of the instrument with the screen and fixation target in preselected positions and showing in dotted lines other positions to which the screen and fixation target may be adjusted.

Fig. 5 is a fragmentary side view of the main section of the instrument with portions broken away and illustrated in section to depict certain details of construction.

Fig. 6 is an enlarged sectional elevation of the mirror lens and its housing on the line 6—6 of Fig. 5.

Fig. 7 is a side elevation of the complete instrument with the main section in vertical or longitudinal alignment with the base section and a part of the screen broken off.

Fig. 8 is a fragmentary side view thereof with parts broken away and shown in section to illustrate the relation between the light condenser system, eyepiece, the lens disc and means for operating the latter, the screen, mirror lens and fixation target as well as other details of construction.

Fig. 9 is an enlarged sectional view of the head of the main section at a location indicated by the line 9—9 in Fig. 8 showing the lens disc and a portion of the operating mechanism therefor.

Fig. 10 is a further enlarged fragmentary sectional elevation on the vertical median line of Fig. 9.

Fig. 11 is an outer or front face view of the head of the main section of the instrument on the same scale as Fig. 9.

In the description of the instrument, the forward or front end thereof is that end which will be adjacent the patient or where the chin rest and screen, with other associated parts, are located, while the rear or back end is that end where the operator or doctor assumes a position for examining the eye or where the mirror lens and fixation target are located.

While the present instrument has been devised primarily for observing and examining the eye, particularly the inner reaches thereof, it is especially useful in the field of education where one or more students and one or more teachers can observe an enlarged image of the optic organ simultaneously thereby permitting the features of interest to be pointed out and defects diagnosed for the benefit of the entire group of observers viewing the enlarged image. Heretofore, an observer was the only one to see what was being viewed and in the case of a student it was impossible to know with certainty whether or not his observation produced an understanding conception of the condition described by the instructor. By the use of the instrument herein disclosed this uncertainty is eliminated or reduced to a minimum because any observation is plainly visible to both the instructor and student and the characteristics of the features observed can be explained with fidelity and sufficiently clear to impose a lasting mental impression upon the student. The instrument also has a high consultation value for doctors in diagnosing conditions of the eye and body because the exact appearance of all features is visible to every observer at the same time.

In the embodiment of the invention disclosed herein 15 represents the base section of the instrument, of any conventional construction, and 16 is the main or observing section supported by and adjustably connected with said base section.

The base section 15 includes a quadrilateral foot or stand 17 on which is formed the riser 18 located to the rear of said foot or stand. Preferably, the riser is narrow and hollowed out to some extent to accommodate certain mechanical elements to be presently described. From the top of the foot or stand and the forward end of the riser projects the inclined narrow arm 19 terminating in a cylindrical bearing 20. A chin rest 21 is adjustably mounted in said bearing 20 whereby it may be raised and lowered through the control knob 22 at the rear of the instrument within easy access of the observer. Also on the bearing 20 is a face bracket or head rest 23 which may be adjusted to various positions by a knob 24 as is usual in instruments of this general type.

The main or observing section 16 of the instrument includes a post 25 slidably and rotatably mounted in the base section, more particularly the riser 18, said post being raised and lowered by the knob 25a and held in any of its adjusted positions by suitable means, such as the knob 26. On top of the post 25 is a guide 27 in which a slide 28 reciprocates, said slide being moved to and fro by the knob 29 to focus the apparatus relative to a patient's eye as will be more fully hereinafter explained.

The slide 28 carries the primary housing or carrier 30 of the main or observing instrument section which is of the general shape of the letter "L" lying on its back with the shorter leg upright and constituting the head 31 of said primary housing while the longer leg assumes a horizontal position and constitutes the body portion 32 of the primary housing.

The housing body 32 is relatively long and narrow or substantially of oblong shape and the forward end gradually diverges latterly to blend into the wide curvilinear head 31. In said head is a chamber 33, Figs. 8, 9 and 10, in communication with a second chamber 34, Fig. 8, at the rear end of the housing body 32, through a bore 35. The chamber 34 preferably has inclined rear wall 36 with a sight opening 37 therein to observe an indicator described below.

In the front or outer face of the head 31 adjacent the upper end thereof is an eyepiece 38 preferably formed as an extension of the front wall of the housing head, said front wall being provided by the formation of the chamber 33, and protruding from the superior area of said head in the vertical center thereof. An achromatic objective lens 39 is contained within the eyepiece.

A lens disc 40, Fig. 9, has a plurality of ground optical lenses 41 of different dioptric power burnished therein adjacent to and spaced around its perimeter. This lens disc 40 is revolvably mounted within the chamber 33 on a shaft 42 suitably journalled in the walls of the housing head 31 and so located that as the lens disc is revolved the optical lenses 41 will be successively positioned in axial alignment with the eyepiece 38.

To readily revolve the lens disc I provide suitable mechanism which, for purposes of illustration, is shown as including a train of gears comprising a driven gear 43 fixed to the lens disc shaft 42, an intermediate gear 44 journalled on a shaft 45 and meshing with said driven gear 43 and a driving gear 46 fixed to an operating shaft 47 within the bore 35 and projecting through the rear end of the horizontal body portion of the housing of the main or observing section of the instrument and on the protruding end of said shaft 47 for turning the same is a knob 48.

On the shaft 47, within the chamber 34 at the rear end of the housing 32, is fixed a bevel gear 49, Fig. 8, meshing with a companion bevel gear 50 on a shaft 51 at an oblique angle to the shaft 47 and perpendicular to the inclined wall 36. Said shaft is journalled in a cross rib 52 and also has a revolvable indicating dial 53 fixed thereon and visible through the sight opening 37. The indicating dial has indicia corresponding to the lenses 41 in the lens disc whereby the positions of said lenses 41 will be shown relative to the eyepiece 38.

Means are also provided to temporarily retain the lens disc 40 in any adjusted position, with a preselected lens 41 of desired dioptric power in axial alignment with the eyepiece. Said means is shown, for purposes of illustration, as including a plurality of depressions 54, Fig. 9, formed in a circle in a face of the lens disc, one depression for each lens 41, and a spring pressed plunger 55, Fig. 10, mounted in a wall of the head of the housing of the main or observing section of the instrument and projecting into the lens disc chamber 33. The plunger is properly aligned to be in the orbit of the depressions as the lens disc is revolved and rides on the lens disc between depressions and is projected into the depressions under a light spring tension but sufficient to hold the lens disc in any adjusted position when said disc is stopped with a depression opposite the plunger.

A curvital viewing screen 56, preferably round, has a parabolically concave image receiving face and said screen may be produced from metal as a concavo-convex unit. While, as above stated, this screen is round by preference, it may be elliptical, oval or some other suitable curvilineal shape. A hollow or tubular trunnion 57 is fitted to the screen between its vertical median line and the perimeter on the horizontal median line considered with relation to either of the ordinary viewing positions suggested by the showing in Fig. 4. When the screen is elliptical the longer axis is the horizontal median line while said screen is in an ordinary viewing position. The tubular trunnion extends through the screen and projects from the back of the latter for assembly in a hole 58, Fig. 10, for rotatably mounting the screen on the rear of the housing head 31. The hole 58 communicates with the chamber 33 and is in axial alignment with the eyepiece as will be the hollow trunnion so that a passageway is provided through the eyepiece 38, with the lens 39 therein, the chamber 33 and the hollow trunnion to the viewing face of the screen.

At the rear end of the housing body 32 is a pillar 59 on which a parabolic casing 60 is rotatably mounted for swinging in a horizontal plane and for this purpose said casing is shown as provided with a neck 61 revolvably fitted in the hollow upper end of the pillar 59. In the casing is a parabolic mirror lens 62 mounted on an adjustable spindle 63 projecting through the back of the casing 60 and, preferably, screw threaded in a sleeve 64 fixed in the casing. The spindle 63 has a knob 65 on the protruding end for revolving the spindle to move the mirror lens to and fro whereby the light projected by said mirror lens onto the screen may be properly focused for the most effective results.

The screen being eccentrically pivoted can be swung over from one side of the main instrument section 16 to the other side thereof and in each position said screen will line in a plane oblique to a vertical plane through the longitudinal axis of said main section 16 and extend outwardly and rearwardly from the head 31 of the housing as shown in Fig. 4.

To provide for holding a source of illumination and light condensing elements, a barrel 66, Figs. 7, 8, 10 and 11, is located on the front face of the head 31 of the main or observing section housing a suitable distance below the eyepiece 38 and may be formed as an integral part of said head. This barrel is open at both the top and bottom ends. In the upper end of the barrel 66 is mounted a substantially cylindrical prism 67 and removably held in place by suitable fastening means 68, such as a screw with its head countersunk in a wall of the barrel. The lower or inner end 69 of this prism is convex as plainly shown in Figs. 3 and 10. The upper or outer end of the prism is appropriately ground to provide an oblique face 70 facing forwardly relative to the apparatus when properly assembled in the barrel 66, and a slightly beveled surface 71 opposite the oblique face 70. The rear surface 72 of the prism is flat and has a coating of silver or other mirror reflective substance thereon.

A light condensing unit includes a circular box-like shell 73 force fitted into the barrel intermediate the ends thereof and fixedly located whereby the prism 67 may be adjusted relative thereto. The bottom of said shell has a large opening 74 therein while the top, which constitutes a diaphragm, has a small hole 75 through it, often referred to as a pinhole. A lens 76 is assembled in the shell 73 for condensing the light rays emanating from a small mercury lamp or bulb 77 carried in a socket 78 mounted in the lower portion of the barrel 66 through the bottom open end thereof and removably held in place by a thumb screw 79 threaded through a wall of said barrel.

The lamp socket 78 is connected to electrical conductors 80 projecting from the housing and in a circuit including two rheostats 81 and 82 mounted on opposite sides of the head of said housing and said conductors are adapted to be connected to a source of electricity and for this purpose plugs 83 are shown, Figs. 7 and 8, for plugging into the electrical system of a building. The rheostats are connected in parallel in the electrical circuit whereby it will be convenient to control the illumination through the right hand rheostat while the screen 56 is at the left hand side of the apparatus and vice versa.

In order to position the patient's eye at the desired angle for examination of any predetermined area thereof I provide an adjustable fixation target at the rear of the instrument. This fixation target is shown as including a horizontal post 84 projecting from the posterior side of the pillar 59 on which is slidably and rotatably mounted a target arm 85. Said target arm is of considerable length and has a longitudinal slot 86 running substantially the entire length thereof and snugly fitting the post 84 whereby the target arm will remain in any adjusted position to which it is set. The adjustments are practically universal since the target arm can be swung around within the entire three hundred and sixty degrees of a circle and also can be slid longitudinally practically its entire length. A target member 87 is slidably mounted on the target arm, as by having a reduced portion thereof projected into the slot 86 and snugly fitting the same whereby said target may be moved lengthwise of the arm between one end of said slot and the relative position of the post 84 where the target member will remain until a subsequent adjustment is made.

From the foregoing description of the structural elements and features it will now be apparent that the optical system of the instrument includes various accepted optical principles involving standard laws of reflection and refraction as apply to both lenses and mirrors.

To set forth these principles as they specifically apply to the instrument described herein, it is well to state that the rays of light from the lamp 77 are projected through the condenser system including the lens 76 and the inner or lower convex end of the prism 67, both directly above said lamp. The intensified beam of light strikes the reflecting prism portion of said prism 67, which reflecting portion is set at the lower margin of the eyepiece 38 (where the eyepiece and front housing wall meet) and is reflected at the appropriate angle to cause said light to pass through the pupil of the patient's eye which is positioned before the eyepiece and thereby illuminates the interior of the eye and the image is reflected through the eyepiece and the hole in the screen to a location for projection on the screen.

With the interior of the eye illuminated, the reflected light, which constitutes an image of the internal ocular structure, passes through the objective lens 39 which, in conjunction with a preselected lens 41 in the lens disc 40, carries the image to the parabolic mirror lens 62 through the hole in the screen 56. This image is then reflected by the mirror lens in a manner to provide an erect enlarged replica thereof on the screen.

The radii of the curvature of the mirror lens and the screen and the distance between them is calculated so as to give the maximum performance with a minimum of distortion and aberrations. The powers of the lenses 41 and the objective lens 39 shall also be determined by the values giving the best performance in the reproduction of the ocular media images.

The eye not under examination is free to follow the fixation target member which can be moved to any point in all quadrants thereby enabling a very extensive area of the internal ocular structure of the eye, under examination, to be viewed in expansive form upon the screen.

During operation of the instrument, the various parts thereof are properly adjusted to obtain the desired fundus picture or other ocular media upon the screen for observation. The image receiving surface of the screen being exposed, the enlarged image picture can be viewed simultaneously by a number of persons, such as a class of students with their teacher or a number of doctors for a consultation.

To utilize the instrument for observation and examination of a patient's eye, such patient is seated in front of and facing said instrument with the chin reposing on the chin rest 21. The patient's forehead is pressed against the face bracket 23 so as to be held stationary. The main section 16 is then rotated until the eyepiece 38 is directly horizontally aligned with the eye to be examined and secured in that adjusted position. The chin rest 21 is then adjusted in the customary or conventional manner until the patient's eye is vertically aligned with the eyepiece 38. The screen 56 is swung over to the right hand side of the instrument, with relation to the patient, for examination of the patient's right eye, as shown in full lines in Fig. 4, and to the left hand side for examination of the patient's left eye, as depicted in dotted lines in said Fig. 4. Next, the illumination is turned on and the mirror lens 62 rotated about the axis of the pillar 59 until the light is reflected onto the screen. The various media of the eye and finally the fundus are examined by turning the lens disc 40 to successively dispose the various dioptric powered lenses into the light path or optical system. Occasionally, it may be necessary to make minor forward or backward adjustments of the mirror lens by manipulating the knob 65 and it will also be necessary to move the main or observing section 16 forward to place the eyepiece as close as possible to the eye without touching the cilia. After all adjustments have been properly accomplished, as outlined above, the amount of illumination can be regulated by turning either of the rheostats 81, 82 until the desired brightness is obtained when the image picture will stand out in magnified form so that all features of the observed area are readily distinguishable. The illumination is to be kept as low as possible at all times to prevent injury to the patient's eyes, especially when examining Macula areas, but it must be sufficiently bright to obtain a sharp and good picture.

After one eye has been thoroughly examined, the main or observing section 16 is released and turned into alignment with the other eye. The screen 56 is swung over to the opposite side of the instrument, as shown in dotted lines in Fig. 4, and the previously described adjustments are made and the examination of said other eye may be proceeded with.

During examination of one eye, the other eye can be directed towards the fixation target and by adjusting the latter the patient's eyes will be raised or lowered or moved to either side to bring various areas of the eye under examination successively into alignment with the mirror lens 62.

Of course I do not wish to be limited to the details of construction herein shown and described for the purpose of explaining the nature of my invention as changes may be made by those skilled in the art to which this invention appertains without departing from the spirit and scope thereof as expressed in the appended claims. It is, therefore, intended that these details be interpreted as illustrative and not in a limiting sense.

Having described the invention, what I claim as new and useful is:

1. In an ophthalmoscope, a conventional base section including the usual adjustable chin rest and face bracket, the combination with said base section of a generally horizontally disposed carrier body adjustably mounted on the base section for positioning in various vertical and horizontal planes and at a selected distance from the face bracket, support an upstanding carrier head on a forward region of said carrier body and having a horizontal light passageway therethrough to be aligned with either eye of a subject whose head is framed by the face bracket, a viewing screen to receive an image and pivoted off center coaxially with the light passageway and having a hole therethrough aligned with the light passageway, a source of light at the front of the carrier head below the light passageway, optical means between said source of light and the area of the light passageway through the carrier head for directing the light in the form of a beam onto the subject under examination in the general line of vision through the light passageway and hole, and a reflecting mirror lens at the rear end of the carrier body in alignment with the hole through and facing said screen to project an image on the latter.

2. The structure according to claim 1 wherein the screen has a concave image receiving face.

3. The structure according to claim 1 wherein the screen is of circular formation and has a concave image receiving face.

4. The structure according to claim 1 wherein the mirror lens is adjustably mounted for regulating the distance between it and the screen.

5. The structure according to claim 1 including means to adjustably mount the mirror lens for rotary movement in a horizontal plane, and other means to adjust said mirror lens relative to the screen for regulating the distance between them.

6. The structure according to claim 1 wherein an eyepiece is formed on the front of the carrier head in coaxial relation to the light passageway, and an objective lens mounted in said eyepiece.

7. The structure according to claim 1, in combination with a fixation target adjustably mounted on a support carried by the carrier body at the rear end thereof.

8. The fixation target specified in claim 7 consisting of a target arm having a longitudinal slot substantially the full length of said arm and registering with the support whereby the arm is slidably and rotatably adjustable, and a target member having a portion projecting into said slot for slidably adjustably mounting said target on said target arm.

9. In an ophthalmoscope, an observing section to be mounted upon a conventional base section, said observing section including a horizontal body portion and a vertical head portion at the forward end of said body portion, said head portion having a relatively large chamber therein extending into the area of the body portion and further provided with a light passageway adjacent the upper end thereof extending completely through said head portion and communicating with the aforesaid chamber, a curvital concavo-convex viewing screen having an eccentrically located hole for axial alignment with the light passageway, means to pivot said screen on the rear of the head portion of said housing to swing in a vertical direction about the axes of the light passageway and hole, an eyepiece projecting from the front face of said head in coaxial relation to the light passageway, a lens disc rotatively mounted within the chamber and carrying a plurality of optical lenses selectively registerable with the light passageway and hole upon rotation of said lens disc, illuminating means mounted on the front face of the head below the eyepiece, reflector means for directing the light in the form of a beam onto the subject under examination in the general line of vision through the light passageway and hole, and means at the rear end of the housing body for reflecting an image of the illuminated interior of a person's eye upon the viewing screen to provide an enlarged picture of said image.

10. The structure defined in claim 9, in combination with a shaft mounted in the housing body and projecting from the rear end thereof for manual rotation, and a train of gears connected with said shaft and the lens disc for rotating the latter.

11. The structure defined in claim 9 wherein a portion of the rear end of the housing body has a chamber therein with an inclined rear wall provided with a sight opening, in combination with an operating shaft mounted in said housing body and extending into both chambers and projecting from the rear end of said housing body for manual rotation, a train of gears connected with said operating shaft and the lens disc for rotating the latter, an indicating dial revolvably mounted in the chamber at the rear end of the housing body and visible through the sight opening, said dial having indications thereon corresponding with the optical lenses in the lens disc, and means to revolve the indicating dial from said operating shaft in unison with the lens disc.

12. The structure defined in claim 9 wherein there is included a pillar mounted on the rear end of the housing body, a parabolic casing rotatably mounted on the upper end of said pillar whereby said casing may be swung from side to side in a horizontal plane, said casing having an open front facing the screen and in line with the hole through said screen, a parabolic mirror lens in said casing for reflecting light rays passing through the light passageway and screen hole onto the face of said screen, and means to adjust the mirror lens to and fro within the casing for focusing light rays on said screen.

13. The structure according to claim 12, in combination with a horizontal post projecting from the posterior side of the pillar, a fixation target arm having a longitudinal slot for rotatably and slidably mounting said arm on said post, and a target member slidably mounted on said arm in said slot.

14. In an ophthalmoscope, an observing section comprising a support consisting of a horizontal body portion and a substantially vertical head, said head having a horizontal light passageway therethrough, a circular viewing screen to receive an image and provided with an eccentrically located hole and pivoted on the rear of said head about the axis of said hole which is in alignment with the light passageway, optical focusing means at the rear end of the support in alignment with the light passageway to reflect light and an image onto the screen, a vertical barrel formed on the front face of said head below the light passageway and open at both ends, a mercury vapor lamp coaxially mounted in the lower end of said barrel, optical means in the upper end of said barrel and including a reflecting surface against which the light rays from the lamp are directed and by which said rays are transmitted laterally from the barrel, and means to hold said lamp in any adjusted position relative to the optical means.

15. The structure defined in claim 14, in combination with means for concentrating the light rays from the lamp through the optical means.

16. The structure according to claim 15 wherein the light concentrating means comprises a circular box-like shell force fitted into the barrel intermediate the ends of the latter at a fixed location, said shell including top and bottom walls, said top wall having a small axial opening and said bottom wall having a larger opening therethrough, and a lens mounted in said shell between the top and bottom walls.

References Cited in the file of this patent

UNITED STATES PATENTS

| | | |
|---|---|---|
| 1,130,106 | Rhodes | Mar. 2, 1915 |
| 1,750,931 | Kellner et al. | Mar. 18, 1930 |
| 1,791,604 | Reardon | Feb. 10, 1931 |
| 2,016,780 | Hartinger | Oct. 8, 1935 |
| 2,489,835 | Traub | Nov. 29, 1949 |

FOREIGN PATENTS

| | | |
|---|---|---|
| 318,487 | Great Britain | Apr. 3, 1930 |
| 389,255 | Great Britain | Mar. 16, 1933 |
| 515,133 | Great Britain | Nov. 27, 1939 |